United States Patent Office.

ALEXANDER P. ASHBOURNE, OF PHILADELPHIA, ASSIGNOR OF ONE-HALF TO CHARLES YOUNG, OF MALVERN, PENNSYLVANIA.

TREATING OR REFINING PORPOISE-OIL.

SPECIFICATION forming part of Letters Patent No. 340,851, dated April 27, 1886.

Application filed December 3, 1885. Serial No. 184,639. (No specimens.)

*To all whom it may concern:*

Be it known that I, ALEXANDER P. ASHBOURNE, a citizen of the United States, residing in the city and county of Philadelphia, State of Pennsylvania, have invented a new and useful Improvement in Treating or Refining Porpoise - Oil, which improvement is fully set forth in the following specification.

The invention consists in divesting porpoise-oil of its offensive odor, dark and gummy nature, and other objectionable features, and converting it into a valuable and desirable article.

In carrying out my invention I take any quantity of crude oil from the body of a porpoise, and to one gallon thereof I add one-half pound of table or common salt, six gallons of cold water, and place the same in a vat and thoroughly agitate it for about thirty minutes, after which it is allowed to rest from twenty-four to forty-eight hours, and a portion of the impurities of the oil is separated with the water and salt. The supernatant oil is now removed to another vat and agitated with cold water, and after six or eight hours the oil is separated from the water and placed in a porcelain kettle and boiled, using one gallon of the oil to six gallons of water and boiling for two hours. While the oil is boiling I add thereto ten grains of alum, the salt and odor of the oil then being carried off with the vapor of the water. The oil and water are now separated, and the oil subjected to a bleaching process by the use of one and a half to two per cent. of hydrochloric acid diluted with fifteen to twenty per cent. of water, and the mixture is heated by a current of steam to about 120° Fahrenheit, passed through it at intervals of about five minutes. The oil is now allowed to separate.

I have found that it is advantageous to use permanganate, chlorate, or bichromate of potassium in combination with the hydrochloric acid. To one hundred pounds of the oil I take about one pound of said salt and one and one-half to two pounds of common salt dissolved in a small quantity of water heated to 120° Fahrenheit. The oil is gradually mixed in a suitable vat with the salt solutions at a temperature of 120° to 130° Fahrenheit, and two to three per cent. of hydrochloric acid, or one to one and a half per cent. of sulphuric acid properly diluted, are added, constantly and slowly stirring the mass. The oil is now placed in a large vat and filtered through a number of filtering-vessels, nine of which are employed in connection with filtering-paper, bullock's blood, and phosphates of either egg-shells, oyster-shells, or animal-bone, or all of them, or other material, the result being an oil of pale-yellow color, comparatively odorless, and divested of dark, gummy, and foreign matters, the oil being clear, fine, sweet, and of superior nature, especially serviceable for lubrication.

Having thus described my invention, what I claim as new, and desire to secure by Letters Patent, is—

1. In the process of refining porpoise-oil, treating the same with common salt and cold water, separating the oil, treating it with fresh water, and then boiling the oil, substantially as described.

2. In the process of refining porpoise-oil, treating the same with salt, boiling the same, and then bleaching the oil, substantially as described.

3. The process of refining porpoise-oil, consisting in treating the oil with salt, boiling the same, then separating the oil and bleaching it, and finally filtering the same, substantially as described.

4. The process of refining porpoise-oil, consisting in first washing the crude oil in a solution of salt and cold water by agitating the mixture, then allowing it to rest from twenty-four to forty-eight hours, after which the supernatant oil is removed; second, washing the partially-prepared oil in a bath of cold water from six to eight hours; third, boiling the oil thus prepared with water and alum, then separating the oil; fourth, bleaching the oil with a dilution of hydrochloric acid, substantially as described.

ALEXANDER P. ASHBOURNE.

Witnesses:
JOHN A. WIEDERSHEIM,
A. P. GRANT.